June 28, 1966   W. M. NONNAMAKER   3,258,050
REMOVABLE SIDEWALL TRIM AND PNEUMATIC TIRE COMBINATION
Filed Dec. 21, 1964
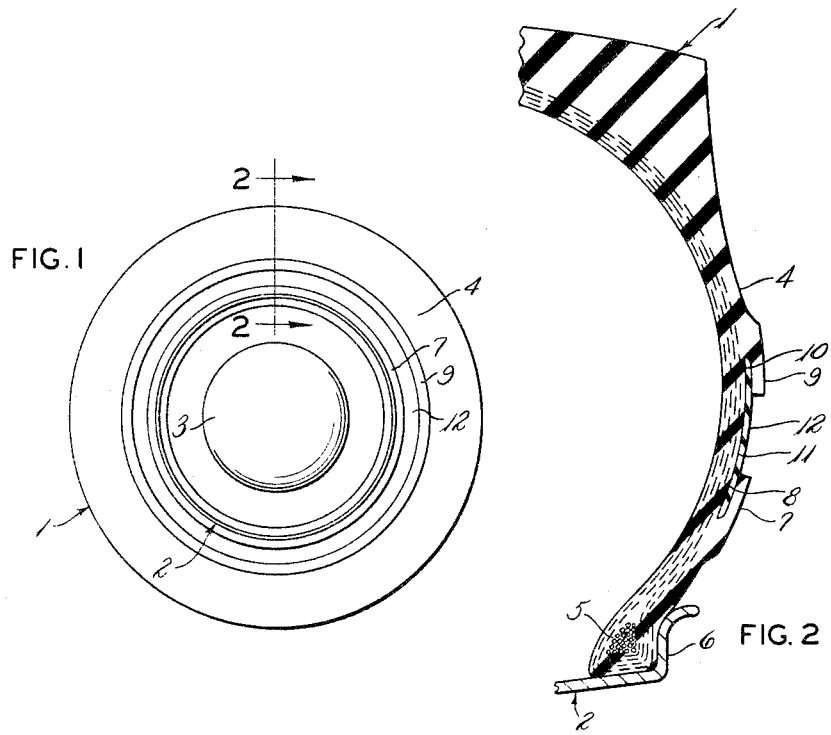
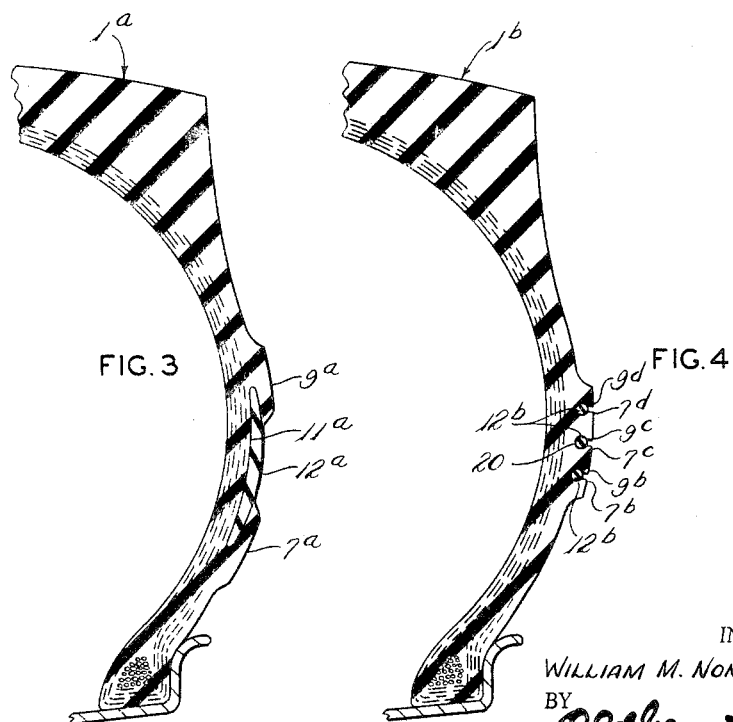
INVENTOR.
WILLIAM M. NONNAMAKER
BY Oldham & Oldham
ATTYS.

United States Patent Office 3,258,050
Patented June 28, 1966

3,258,050
REMOVABLE SIDEWALL TRIM AND PNEUMATIC TIRE COMBINATION
William M. Nonnamaker, Akron, Ohio, assignor to The Mohawk Rubber Company, Akron, Ohio, a corporation of Ohio
Filed Dec. 21, 1964, Ser. No. 420,010
10 Claims. (Cl. 152—353)

The present invention relates to novel and improved removable sidewall trim members for use in combination with pneumatic tires for providing an attractive, decorative multi-colored sidewall in the tire and sidewall trim combination.

This is a continuation-in-part of my application Serial No. 397,860, filed September 21, 1964, and now abandoned.

Appreciable work has been done in the past to endeavor to avoid the manufacture of pneumatic tires that have a contrasting color trim member integrally built as a unit with the tire sidewall even though such tires have extensive commercial sale. While many thousands of pneumatic tires have been made heretofore with contrasting color trim rings or sections built into the tire sidewall, it is a relatively difficult, costly manufacturing operation to produce these multi-colored pneumatic tire sidewalls as made and sold commercially today.

While efforts have been made heretofore to provide removable types of sidewall trim members that can be affixed in a pneumatic tire sidewall, it has been difficult to provide attractive pneumatic tire trim members that can be positively secured in place on, or in combination with, a pneumatic tire sidewall so as to remain in good operative engagement therewith over a long service life.

One object of the invention is to provide a removable side wall trim member that is affixed to a pneumatic tire sidewall by being positioned at its radial edge portions under grooves provided by a pair of concentric overhanging shoulders formed in radially spaced relation on the tire sidewall and where the amount of the sidewall trim member exposed between the adjacent opposed shoulders is substantially equal in length to the combined total length of the trim member sections that are received under the overhanging shoulders for positioning action thereby.

Another object of the invention is to provide an improved pneumatic tire trim and tire sidewall combination wherein a plurality of concentric sidewall trim members can be readily removably positioned in grooves formed in the tire sidewall in concentric relationship to each other.

A further object of the invention is to provide removable sidewall trim members that are effectively anchored between a pair of opposed, undercut shoulders formed in the tire sidewall so that the shoulders on the tire extend out radially an appreciable distance from the trim member to aid in protecting the trim member against scuffing or other damages thereto when the tire on which the trim member is mounted strikes a curb, or other obstacle.

The foregoing and other objects and advantages of the invention will be made more apparent as the specification proceeds.

Attention now is particularly directed to the structures shown in the accompanying drawings where:

FIGURE 1 is an elevation of a pneumatic tire and wheel combination in operative association with each other and where the pneumatic tire has a trim member of the invention operatively associated therewith.

FIGURE 2 is an enlarged fragmentary vertical section taken on line 2—2 of FIGURE 1;

FIGURE 3 is a fragmentary vertical section, like FIGURE 2, of a modification of the invention; and FIGURE 4 is a fragmentary vertical section, like FIGURE 2, of yet a further modification of the invention.

When referring to corresponding members shown in the specification and referred to in the drawing, corresponding numerals are used to facilitate comparison therebetween.

The present invention, generally speaking, as to one embodiment thereof relates to a novel combination of a pneumatic tire with an annular flexible tire trim member that engages a side wall of the tire and where a continuous annular radially outwardly facing flexible overhanging shoulder is formed on the tire sidewall radially outwardly of the tire bead, a continuous annular flexible radially inwardly facing overhanging shoulder is formed on a radially outer portion of the tire sidewall, which shoulders define an annular groove therebetween that extends thereunder and around the circumference of the tire sidewall, the tire trim member being of a radial length substantially equal to that of the groove and being positioned in the groove with its radially inner and outer edges received under the overhanging portions of the shoulders to be secured to the tire thereby, the radial length of the tire trim member that is exposed between the tire sidewall shoulders being about equal to the total radial lengths of the tire trim member that are received under the overhanging shoulders.

With reference to the details of the structure shown in the drawings, a substantially conventional pneumatic tire 1 is shown that is conventionally positioned upon a metal wheel 2 that usually has a wheel cover or hub cap 3 suitably secured thereto.

In the enlarged section of the tire 1 as shown in FIGURE 2, it is indicated that a tire sidewall 4 is formed that has a bead section 5 therein that engages a flange 6 provided on the wheel 2.

The tire 1, in the sidewall 4 thereof, has a continuous, annular, radially outwardly facing flexible overhanging shoulder 7 provided therein that has an undercut 8 formed thereunder. A similar continuous, annular, flexible, radially inwardly facing, overhanging shoulder 9 is formed on the sidewall 4 at a radially outer portion of the sidewall in relation to the positioning of the shoulder 7 and with such shoulders 7 and 9 in the adjacent sections thereof being radially spaced from each other. An undercut 10 is provided under the overhanging shoulder 9.

These shoulders 7 and 9 and the undercuts 8 and 10 formed thereunder combine with the space between these shoulders to form a groove 11 that extends around the circumference of the sidewall and is of annular shape. Usually with the construction shown in FIGURE 2, the sidewall 4 is of theoretically substantially uniform radial section in the portion thereof occupied by the shoulders 7, 9 and the groove 11 so that in producing the tire 1, suitable means are associated with the tire mold to provide an opening between the adjacent edges of the shoulders 7 and 9 so as to expose a radial length of a tire trim ring or member 12 that is received in the groove 11. This tire trim member is made from a suitable resilient or flexible material, usually a natural, or synthetic rubber, or similar material which is flexible and has substantially uniform flexibility in all portions thereof as it is of homogeneous composition. The tire trim member 12 may be of uniform thickness for the radial length thereof.

It is a feature of the invention that the undercut 8 and the undercut 10 are of such a radial length in the tire as to be at least substantially equal in total length to the radial spacing between the shoulders 7 and 9. By this particular construction, major portions of the tire trim member are effectively resiliently anchored into engagement with the tire sidewall 4. As the shoulders 7 and 9 are of a resilient nature, the tire trim member may have a section of one edge thereof inserted under one of the shoulders and then the entire trim member can be worked into engagement with the opposed shoulders to be resiliently positioned thereunder.

FIGURE 2 of the drawings clearly brings out the fact that the shoulders 7 and 9 are of a thickness in the tire, such as at least the thickness of the trim member and preferably twice such thickness, that the trim member 12 is appreciably recessed in the tire sidewall as this materially aids in preventing damage to the trim member when in use. The construction also prevents forcible ejection of the trim member from engagement with the tire sidewall and is overhanging shoulders should the tire be accidentally bumped against a curb, or be scraped therealong.

In FIGURE 3, a modified tire 1a is shown, and in this instance a trim member 12a is engaged between opposed shoulders 7a and 9a of the tire. The trim member 12a is shown of maximum thickness intermediate the ends thereof, but with again the exposed length of the tire trim member being substantially equal to the combined lengths of undercuts under shoulders 7a and 9a. The shoulders 7a and 9a may have beveled edges, or be formed with edges that are substantially normal to the groove 11a, as desired. These shoulders 7a and 9a are of such a thickness to extend axially beyond the tire trim member or ring 12a which thus is positioned within a protected portion of the tire sidewall. Such relatively massive shoulders protect the tire trim member 12a and facilitate good operative engagement of the trim member with the tire even under severe abuse conditions.

A further modification of the invention is shown in FIGURE 4 wherein a tire 1b is provided that preferably has a plurality of pair of overhanging, radially spaced, opposed shoulders 7b, 9b, and 7c and 9c, and 7d and 9d, respectively, provided therein, as shown in the drawings. Each of these shoulders has an undercut provided thereunder and with all of the shoulders being positioned with adjacent edge portions thereof in radially spaced relationship on the tire. It is a further feature of the unit shown in FIGURE 4 that an innermost section 20 of each of the grooves formed between the adjacent pairs of shoulders is of substantially circular shape in section. Thus, a plurality of tire trim members 12b, each of which is of substantially circular shape in cross section is positioned between each of the pairs of opposed shoulders in the enlarged or circular sections 20 at the inner edges thereof. The resilient trim rings or members 12b can be readily and easily progressively forced into and out of engagement with their associated grooves 20. Preferably all of the pairs of shoulders and the grooves formed therebetween are in concentric relationship with each other. Thus, a plurality of colors could be provided by using different colors for the individual trim rings 12b, or else a plurality of rings of one color, such as white, could be provided by the trim rings when positioned in a conventional black rubber tire sidewall. The rings 12b are confined at the edges by portions thereof substantially equal in combined radial length to the exposed portion of the rings, and also, are protected by the protruding shoulders, as in the other embodiments of the invention.

By the present invention, a very effective engagement has been provided between the tire trim member and a tire sidewall. These trim rings can be made relatively inexpensively and can be positioned manually without great difficulty. The trim rings will give excellent service life and will remain tightly in engagement with the pneumatic tire even under high speed and abuse conditions.

In the tire assemblies of the invention, when inflated, the action of forcing the tires outwardly into full toroidal shape acts to pull the associated shoulders down into tight engagement with the trim rings. The tire sidewall in the area thereof that has a trim ring therein is of a reinforced construction by being provided with a thicker rubber layer at the portion thereof receiving the trim rings. In many tires, as made today, a reinforced section of the tire sidewall is provided to prevent tire damage by curb scuffing, bumping or the like so that provision of the groove 11 may effect some savings or rubber in the tire when it is made.

If desired, the trim member 12, for example, can be adhesively secured in the groove 11 provided in the tire sidewall. Thus, any suitable adhesive or cement can be dabbed either in the groove formed in the tire sidewall or upon the surface of the tire trim member to be positioned against the base portion of the groove so as to secure the trim member more permanently in place. Naturally the entire annular area of any of the grooves provided in the tire sidewall can be coated with a layer of cement, or else the back or base surface of the trim member could be completely coated with a suitable cement or adhesive so as to secure the trim member, in effect, in the tire sidewall groove permanently. When cement is just dabbed on the tire trim member, such member probably could be removed at any suitable time without any damage thereto, or to the tire.

The open space provided by the grooves formed between the shoulders 7b and 9b, etc. preferably is about equal to the radial depth of such shoulders to give excellent protection to the tire trim rings received in the grooves.

It will be noted that the shoulders 7a and 9b may have beveled edges but they will still nicely protect the positioned trim ring and will engage substantially as much of the trim ring as they expose.

One example of a stiffer but flexible material that may be used in the practice of the invention is linear high density polyethylene. In such a ring, it may be made of about .020 to .040″ thick and good results can still be obtained.

In one tire that has tested out satisfactorily, the tire sidewalls 7 and 9 were, for example, of 3/16″ thickness, the trim ring had a maximum thickness of 5/32″, the undercut of the shoulders 7 and 9 extended 3/8″, and the opening between adjacent edges of the shoulders was 1/2″.

Another advantage has been noted in the manufacture and assembly of resilient trim members of the invention. That is, the trim members seem to be more firmly positioned if they are under some tension when seated in a groove in a tire sidewall. For example, a tire sidewall was molded to have the minimum diameter of the groove 11 under the shoulder 7 to be 18.125″ while the trim member 12 had a minimum mold diameter of 16.938″. Hence, the trim member when assembled in the tire sidewall groove was stretched approximately 7% in diameter and in circumference. In other tests, the trim member has been stretched as much as about 2″ from an original diameter of about 17″ to be mounted effectively and operationally in a tire sidewall groove. Hence, as a further feature of the invention, the same size of a trim member can, for example, be mounted in a 14″ or a 15″ tire and stocking of a number of sizes of trim rings is either completely avoided or only a few size rings need be provided. The trim members preferably would be stretched from about 5% to about 14% in most instances when formed from a resilient material. The thickness of the trim member 12a, for example, may be about 4/32″ maximum tapering to about 2/32″ at its edges. Naturally the trim ring stretch can be varied by compounding changes that are correlated with the molded size of a trim ring to permit it to be placed operatively in a predetermined size tire.

The trim ring may be lubricated with soap before it is inserted in a tire. The trim ring may be made from two compositions to provide different colors on its two face surfaces.

While the amount of exposed length of a trim member in relation to the amount of the trim member received in a tire sidewall groove can be varied, the present invention contemplates that the trim member be anchored with at least substantially as long a total length radial section as the radial section thereof that is exposed in the tire.

In view of the above, it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, said tire trim member being free for movement relative to said tire, the radial length of said trim member exposed between said tire sidewall shoulders being about equal to the total radial lengths of said trim member which are received under said shoulders.

2. The combination of a pneumatic tire with an annular flexible tire trim member engaging a sidewall of said tire, a continuous annular radially outwardly facing flexible overhanging shoulder formed on said tire sidewall radially outwardly of the tire bead, a continuous annular flexible radially inwardly facing overhanging shoulder formed on a radially outer portion of said tire sidewall, said shoulders defining an annular groove therebetween that extends thereunder and around the circumference of said sidewall, said tire trim member being of a radial length substantially equal to that of said groove, said tire trim member being positioned in said groove and having marginal portions received under the overhanging portions of said shoulders to be secured to said tire thereby, the radial length of said trim member exposed between said tire sidewall shoulders being substantially equal to the combined radial lengths of said trim member which are received under said shoulders.

3. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, the radial length of said trim member exposed between said tire sidewall shoulders being substantially equal to the combined radial lengths of said trim member which are received under said shoulders, the overhanging portions of said shouders being of substantially uniform thickness throughout, said trim member being of a maximum thickness less than the thickness of said shoulders whereby said shoulders extend axially beyond said trim member to protect it in the tire assembly.

4. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said groove being enlarged at its axially inner portion and being of generally circular shape in section at said inner portion, said tire trim member comprising resilient material having flexibility at all portions thereof, said tire trim member being of generally circular shape in cross section and being resiliently positioned within said inner portion of said groove, said tire having a plurality of similar concentric grooves in the sidewall thereof with a said trim member received removably in each said groove.

5. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall and spaced from said radially outwardly facing shoulder, and shoulders defining continuous groove therebetween that extends around the circumference of said sidewall, said groove being enlarged as its axially inner portion and being of generally circular shape in vertical section at said inner portion, said tire trim member being of circular shape in cross section and being resiliently positioned within said inner portion of said groove, a portion of said trim member being visible through the space between said shoulders.

6. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient, elastic material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, said tire trim member being under tension in said groove, the radial length of said trim member exposed between said tire sidewall shoulders being substantially equal to the combined radial lengths of said trim member which are received under said shoulders.

7. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient, elastic material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, said tire trim member being stretched between about 5% to 14% of its original diameter as positioned in said groove, the radial length of said trim member exposed between said tire sidewall shoulders being about equal to the total radial lengths of said trim member which are received under said shoulders.

8. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders being of at least substantially uniform thickness for the length thereof and defining an annular groove therebetween that extends around the circumference of said sidewall, said tire trim member comprising resilient, elastic material having flexibility at all portions thereof, said tire trim member being of a radial length greater than the distance between one radial margin of said groove and the closest portion of the shoulder at the opposite margin of said groove, said trim member being of a maximum thickness less than the maximum thickness of said shoulders, said tire trim member being positioned in said groove and having its radially inner and outer edges received under the overhanging portions of said shoulders to be secured to said tire thereby, said tire trim member being stretched between about 5% to 14% of its original diameter as positioned in said groove, the radial length of said trim member exposed between said tire sidewall shoulders being substantially equal to the combined radial lengths of said trim member which are received under said shoulders.

9. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall and spaced from said radially outwardly facing shoulder, said shoulders defining a continuous groove therebetween that extends around the circumference of said sidewall, said groove being enlarged as its axially inner portion and being of generally circular shape in vertical cross section at said inner portion, said tire trim member being of circular shape in cross section and being resiliently positioned within said inner portion of said groove, the adjacent edges of said shoulders being spaced a distance from each other about equal to the radial thickness of said shoulders, a portion of said trim member being visible through the space between said shoulders.

10. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient, elastic material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, said tire trim member being stretched when positioned in said groove, said trim member being of maximum thickness less than the thickness of said shoulders and being exposed for such radial distance between said shoulders that said shoulders extend axially of the tire beyond said trim member to aid in shielding said trim member in the tire assembly.

References Cited by the Examiner
UNITED STATES PATENTS

| | | | |
|---|---|---|---|
| 2,761,489 | 9/1956 | Kraft | 152—353 X |
| 2,963,326 | 12/1960 | Wood | 152—353 X |
| 3,128,815 | 4/1964 | Nonnamaker | 152—353 |

ARTHUR L. LA POINT, *Primary Examiner.*

C. W. HAEFELE, *Assistant Examiner.*